US008386572B2

(12) United States Patent
Denner et al.

(10) Patent No.: US 8,386,572 B2
(45) Date of Patent: *Feb. 26, 2013

(54) SYSTEM AND METHOD FOR CIRCUMVENTING INSTANT MESSAGING DO-NOT-DISTURB

(75) Inventors: Gary Denner, Celbridge (IE); Cynthia E. Barber-Mingo, Westford, MA (US); Ruthie D. Lyle, Durham, NC (US); Patrick Joseph O'Sullivan, Ballsbridge (IE); Mary Ellen Zurko, Groton, MA (US)

(73) Assignee: International Business Machines Corporation, Armonk, NY (US)

( * ) Notice: Subject to any disclaimer, the term of this patent is extended or adjusted under 35 U.S.C. 154(b) by 132 days.

This patent is subject to a terminal disclaimer.

(21) Appl. No.: 12/347,584

(22) Filed: Dec. 31, 2008

(65) Prior Publication Data

US 2010/0169438 A1 Jul. 1, 2010

(51) Int. Cl.
G06F 15/16 (2006.01)

(52) U.S. Cl. .................. 709/206; 379/88.13; 379/93.02; 379/201.01; 455/70; 455/412.1

(58) Field of Classification Search ............... 379/88.16, 379/93.02, 207.02, 88.13, 199, 201.01; 709/206, 709/207; 455/517, 90.2; 365/232; 707/10
See application file for complete search history.

(56) References Cited

U.S. PATENT DOCUMENTS

| 5,828,742 | A * | 10/1998 | Khalid et al. .................. 379/199 |
| 6,798,874 | B1 * | 9/2004 | Ohlinger et al. .......... 379/201.01 |
| 7,856,213 | B2 * | 12/2010 | Xue et al. ...................... 455/90.2 |
| 2003/0229670 | A1 * | 12/2003 | Beyda ........................... 709/206 |
| 2004/0223599 | A1 * | 11/2004 | Bear et al. ................ 379/207.02 |
| 2005/0192039 | A1 * | 9/2005 | Xue et al. ...................... 455/517 |
| 2005/0203916 | A1 * | 9/2005 | Hirose ............................. 707/10 |
| 2005/0223075 | A1 * | 10/2005 | Swearingen et al. ......... 709/207 |
| 2005/0249023 | A1 * | 11/2005 | Bodlaender ................... 365/232 |
| 2006/0036688 | A1 | 2/2006 | McMahan et al. |
| 2006/0190547 | A1 | 8/2006 | Bhogal et al. |
| 2007/0223662 | A1 * | 9/2007 | Jain et al. ................... 379/93.02 |
| 2008/0159490 | A1 * | 7/2008 | Gaudin et al. ............. 379/88.16 |
| 2009/0323907 | A1 * | 12/2009 | Gupta et al. ............... 379/88.13 |
| 2010/0115033 | A1 * | 5/2010 | Geffner et al. ............... 709/206 |

OTHER PUBLICATIONS

Avrahami, Daniel et al., "QnA: Augmenting an Instant Messaging Client to Balance User Responsiveness and Performance", Conference '04, ACM, 2004, pp. 1-4. Jan. 2, 2004.
Cutrell, Edward et al., "Notification, Disruption, and Memory: Effects of Messaging Interruptions on Memory and Performance", Microsoft Research, One Microsoft Way, Redmond, WA 98052 USA, pp. 1-7.
LeeTiernan, Scott et al., "Effective Notification Systems Depend on User Trust", Microsoft Research, One Microsoft Way, Redmond, WA 98052 USA, pp. 1-2.
http://www.microsoft.com/smallbusiness/resources/technology/communications/10_tips_for_using_instant_messaging_for_business.mspx, AMA/ePolicy Institute Research, pp. 1-19.

(Continued)

Primary Examiner — Dustin Nguyen
(74) Attorney, Agent, or Firm — Holland & Knight LLP; Brian J. Colandreo, Esq.; Michael T. Abramson, Esq.

(57) ABSTRACT

A system and method for circumventing a do-not-disturb status of an instant messaging user including defining a trusted user. A do-not-disturb status of an instant messaging user is identified. The trusted user is allowed to circumvent the do-not-disturb status of the instant messaging user.

26 Claims, 5 Drawing Sheets

OTHER PUBLICATIONS http://www.zdnetasia.com/news/security/0,39044215,39222828,00.htm, ZDNet Asia News, downloaded Feb. 2, 2012, pp. 1-6.
http://www.carrollcommunications.com/ipoffice/5donotdisturb.html, downloaded Feb. 2, 2012, pp. 1-2.
http://www.scrtc.com/donotdisturbservice.html, downloaded Apr. 27, 2012, pp. 1-2.
OASIS, Assertions and Protocol for the OASIS Security Assertion Markup Language (SAML) V1.1, Oasis Standard Sep. 2, 2003, pp. 1-53.
Mahy et al., "A Call Control and Multi-party Usage Framework for the session Initiation Protocol (SIP)," http://www.ietf.org/internet-drafts/draft-ietf-sipping-cc-framework-05.txt, downloaded Apr. 27, 2012 pp. 1-46.
http://www.ecma-international.org/publications/standards/Ecma-193.htm, downloaded on Feb. 2, 2012, pp. 1-2.

* cited by examiner

SYSTEM AND METHOD FOR CIRCUMVENTING INSTANT MESSAGING DO-NOT-DISTURB

TECHNICAL FIELD

This disclosure relates to instant messaging and, more particularly, to systems and methods for circumventing a do not disturb status in instant messaging systems.

BACKGROUND

Instant messaging provides real-time text based communication between two or more users interacting via computers or mobile devices. The more immediate and direct interaction provided by instant messaging often tends to more closely resemble a conversation, as compared to the more "letter like" format of email. The direct interaction between users can provide highly effective and convenient collaboration. For example, problems of unanswered emails and unreturned phone messages can be avoided.

While instant messaging can be a very useful tool for communication and collaboration, there are times when a user does not wish to be bothered or interrupted. This convenience is provided by a "do not disturb" ("DND") feature in the instant messaging application. The do-not-disturb feature of an instant messaging system is typically enforced from the receivers' client by setting an associated status. Once this status is set it prevents other users from contacting the person until such time as the person returns to an active (or similar) status. However, situations can arise when it is deemed necessary to contact a person who is operating in do-not-disturb status. Conventional instant messaging systems do not provide a do-not-disturb override capability. Therefore, once do-not-disturb status has been activated, the instant messaging user is unreachable by instant message until the user returns to active status.

SUMMARY OF THE DISCLOSURE

In a first implementation, a computer program product includes a computer readable medium having a plurality of instructions stored on it. When executed by a processor, the instructions cause the processor to perform operations including defining a trusted user. The trusted user may be allowed to identify a do-not-disturb status of an instant messaging user. The trusted user is allowed to circumvent the do-not-disturb status of the instant messaging user.

One or more of the following features may be included. The instructions for defining a trusted user may include instructions for defining an exception list including one or more trusted users.

The instructions for allowing the trusted user to circumvent the do-not-disturb status of the instant messaging user may include instructions for allowing the trusted user to circumvent the do-not-disturb status of the instant messaging user based upon, at least in part, an instant messaging system attribute. The instant messaging system attribute may include an instant messaging user group. The instructions for allowing the trusted user to circumvent the do-not-disturb status of the instant messaging user may include instructions for allowing the trusted user to delegate a third party to circumvent the do-not-disturb status of the instant messaging user. The instructions for allowing the trusted user to delegate a third party to circumvent the do-not disturb status of the instant messaging user may include instructions for allowing the third party to circumvent the do-not disturb status of the instant messaging user for a predetermined period of time.

According to another implementation, a computing system includes a processor, and a memory module coupled with the processor. A first software module is executable by the processor and the memory module. The first software module is configured to define a trusted user. A second software module is executable by the processor and the memory module. The second software module is configured to allow the trusted user to identify a do-not-disturb status of an instant messaging user. A third software module is executable by the processor and the memory module. The third software module is configured to allow the trusted user to circumvent the do-not-disturb status of the instant messaging user.

One or more of the following features may be included. The first software module, configured to define a trusted user, may be configured to define an exception list including one or more trusted users.

The third software module, configured to allow the trusted user to circumvent the do-not-disturb status of the instant messaging user, may be configured to allow the trusted user to circumvent the do-not-disturb status of the instant messaging user based upon, at least in part, an instant messaging system attribute. The instant messaging system attribute may include an instant messaging user group. The third software module configured to allow the trusted user to circumvent the do-not-disturb status of the instant messaging user, may be configured to allow the trusted user to delegate a third party to circumvent the do-not-disturb status of the instant messaging user. The third software module configured to allow the trusted user to delegate a third party to circumvent the do-not disturb status of the instant messaging user, may be further configured to allow the third party to circumvent the do-not disturb status of the instant messaging user for a predetermined period of time.

According to yet another implementation, a computer implemented method includes defining a trusted user. The trusted user is allowed to identify a do-not-disturb status of an instant messaging user. The trusted user is allowed to circumvent the do-not-disturb status of the instant messaging user.

One or more of the following features may be included. Defining a trusted user may include defining an exception list including one or more trusted users.

Allowing the trusted user to circumvent the do-not-disturb status of the instant messaging user may include allowing the trusted user to circumvent the do-not-disturb status of the instant messaging user based upon, at least in part, an instant messaging system attribute. The instant messaging system attribute may include an instant messaging user group. Allowing the trusted user to circumvent the do-not-disturb status of the instant messaging user may include allowing the trusted user to delegate a third party to circumvent the do-not-disturb status of the instant messaging user. Allowing the trusted user to delegate a third party to circumvent the do-not disturb status of the instant messaging user may include allowing the third party to circumvent the do-not disturb status of the instant messaging user for a predetermined period of time.

The details of one or more implementations are set forth in the accompanying drawings and the description below. Other features and advantages will become apparent from the description, the drawings, and the claims.

DETAILED DESCRIPTION

Figure 1:
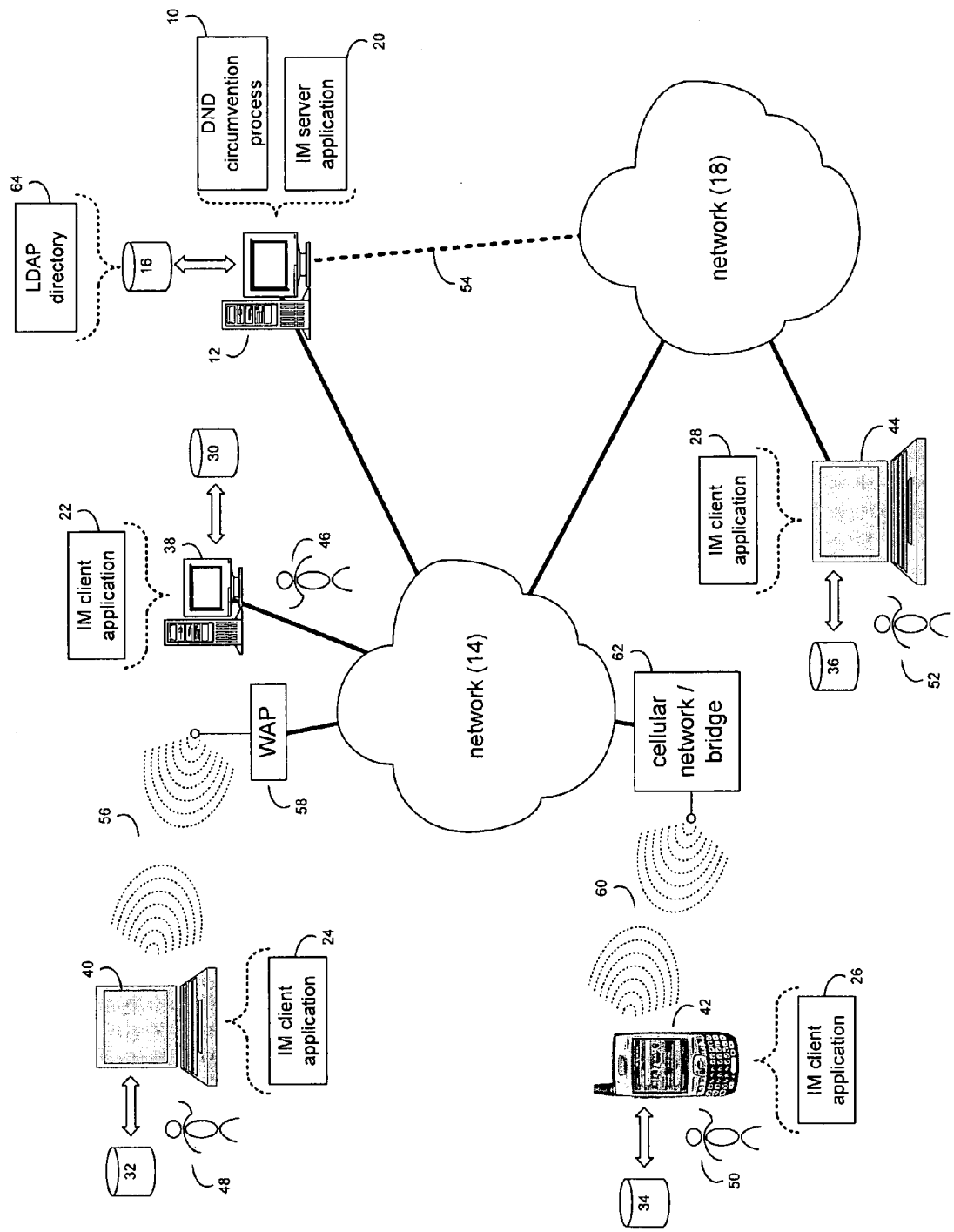
FIG. 1 diagrammatically depicts a do-not-disturb circumvention process and an instant messaging application coupled to a distributed computing network.

System Overview:

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown do-not-disturb circumvention process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® XP Server; Novell® Netware®; or Red Hat® Linux®, for example (Microsoft and Windows are registered trademarks of Microsoft Corporation in the United States, other countries, or both; Novell and NetWare are registered trademarks of Novell Corporation in the United States, other countries, or both; Red Hat is a registered trademark of Red Hat Corporation in the United States, other countries, or both; and Linux is a registered trademark of Linus Torvalds in the United States, other countries, or both). Alternatively, do-not-disturb circumvention process 10 may reside on and be executed, in whole or in part, by a client electronic device, such as a personal computer, notebook computer, personal digital assistant, or the like.

As will be discussed below in greater detail, do-not-disturb circumvention process 10 may define a trusted user. Do-not-disturb circumvention process 10 may identify a do-not-disturb status of an instant messaging user. The trusted user may be allowed to circumvent the do-not-disturb status of the instant messaging user.

The instruction sets and subroutines of do-not-disturb circumvention process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive; a tape drive; an optical drive; a RAID array; a random access memory (RAM); and a read-only memory (ROM).

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14. (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an instant messaging ("IM") server application (e.g., IM server application 20), examples of which may include, but are not limited to Lotus® Sametime®, Microsoft Office Live Communications Server, Jabber® XCP™, and AOL Instant Messenger® (Lotus and Sametime are registered trademarks of International Business Machines Corporation in the United States, other countries, or both; Jabber is a registered trademark of Jabber Inc. in the United States, other countries, or both; Jabber XCP is a trademark of Jabber Inc. in the United States, other countries, or both; and AOL Instant Messenger is a registered trademark of AOL LLC in the United States, other countries, or both) Instant messaging server application 20 may route instant messages to instant messaging client applications, e.g., instant messaging client applications 22, 24, 26, 28, examples of which may include but are not limited to Lotus Sametime, Microsoft Office Communicator, Google Talk™, and AOL Instant Messenger, for example (Google Talk is a trademark of Google Inc. in the United States, other countries, or both). Do-not-disturb circumvention process 10 may be a stand alone application that interfaces with instant messaging server application 20 or an applet/application that is executed within instant messaging server application 20.

The instruction sets and subroutines of instant messaging server application 20, which may be stored on storage device 16 coupled to server computer 12 may be executed by one or more processors (not shown) and one or more memory modules (not shown) incorporated into server computer 12.

As mentioned above, in addition/as an alternative to being a server-based application residing on server computer 12, the do-not-disturb circumvention process may be a client-side application (not shown) residing on one or more client electronic device 38, 40, 42, 44 (e.g., stored on storage device 30, 32, 34, 36, respectively), and executed by a processor (not shown) and memory module (not shown) incorporated into the one or more client electronic devices. The client-side do-not-disturb circumvention process may be a stand alone application that interfaces with an instant messaging client application (e.g., instant messaging client applications 22, 24, 26, 28), or may be an applet/application that is executed within an instant messaging client application. As such, the do-not-disturb circumvention process may be a client-side application, a server-based application, or a hybrid client-side/server-based application, which may be executed, in whole or in part, by server computer 12, and/or one or more of client electronic device (e.g., client electronic devices 38, 40, 42, 44).

The instruction sets and subroutines of instant messaging client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drive; tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, personal digital assistant 42. notebook computer 44, a data-enabled, cellular telephone (not shown), and a dedicated network device (not shown), for example. Using instant messaging client applications 22, 24, 26, 28, users 46, 48, 50, 52 may access instant messaging server application 20 and may receive, create, and manage instant messages.

Users 46, 48, 50, 52 may access instant messaging server application 20 directly through the device on which the instant messaging client application (e.g., instant messaging client applications 22, 24, 26, 28) is executed, namely client electronic devices 38, 40, 42, 44, for example. Users 46, 48, 50, 52 may access instant messaging server application 20 directly through network 14 or through secondary network 18. Further, server computer 12 (i.e., the computer that executes instant messaging server application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or a custom operating system (Windows CE is a registered trademark of Microsoft Corporation in the United States, other countries, or both).

Figure 2:
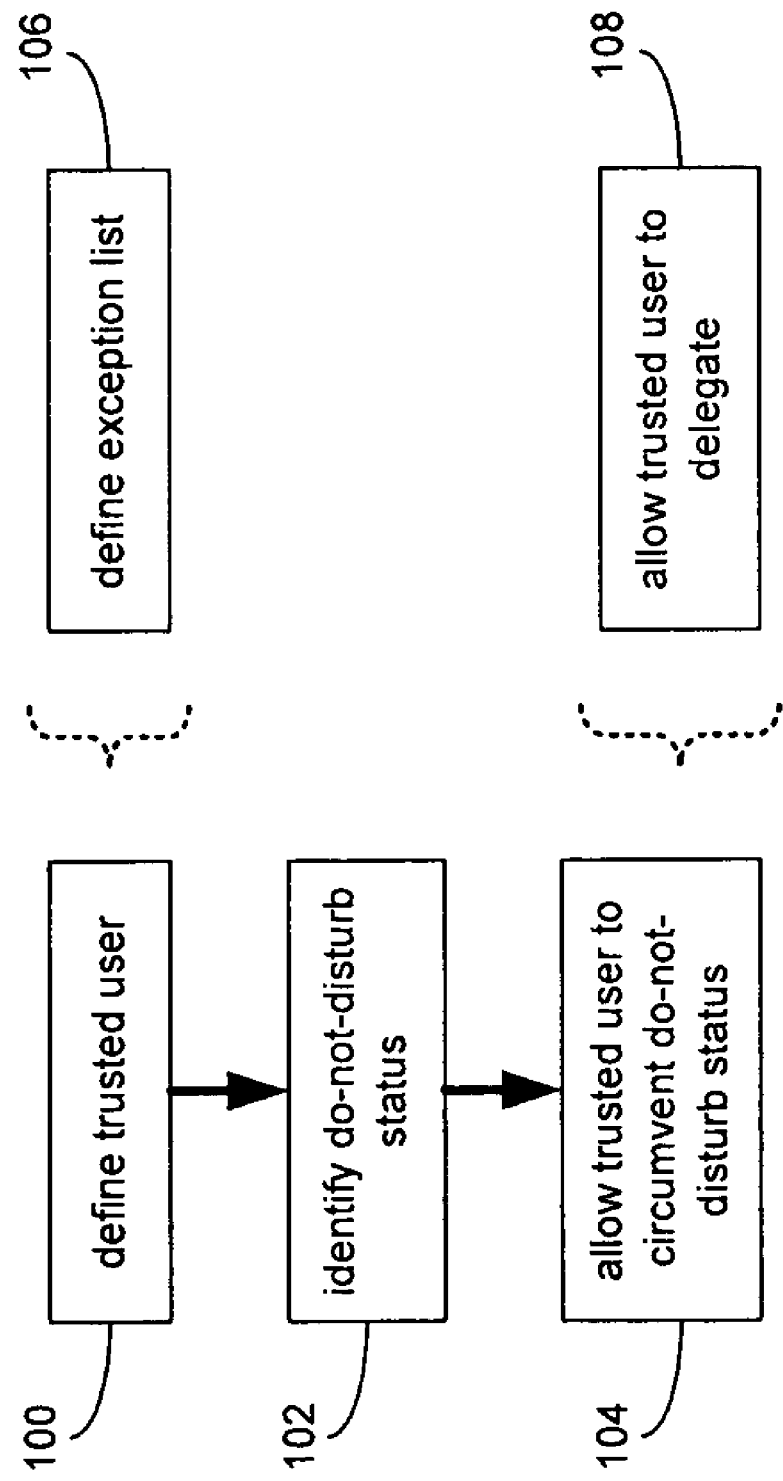
FIG. 2 is a flowchart of a process executed by the do-not-disturb circumvention process of FIG. 1.

The Do-Not-Disturb Circumvention Process:

Referring also to FIG. 2, do-not-disturb circumvention process 10 may define 100 a trusted user. Further, do-not-disturb process 10 may allow the trusted user to identify 102 a do-not-disturb status of an instant messaging user. Do-not-disturb process 10 may allow 104 the trusted user to circumvent the do-not-disturb status of the instant messaging user.

For example, do-not disturb circumvention process 10 may define 100 one or more users (e.g., user 46) as being trusted users. The trusted users may include, for example, system administrators, users in trusted management positions, or the like. Defining 100 the trusted user may include defining 106 an exception list including one or more trusted users (e.g., including user 46). The exception list may include a listing of users to whom one or more restrictions and/or controls (e.g., do-not-disturb status of other instant messaging users) associated with the instant messaging system (e.g., including instant messaging server application 20 and one or more of instant messaging client applications 22, 24, 26, 28) may not apply. The exception list may not be a policy-based construct, but may rather be a listing of individuals exempt from one or more of the restrictions and/or controls provided by the instant messaging system.

In maintaining the applicability of do-not-disturb status, there may be at least some restrictions upon who may be allowed to circumvent a do-not-disturb status of an instant messaging user. As such, it may be desirable for do-not-disturb circumvention process 10 to define 106 an exception list including a relatively small number of trusted users. For example, a company may have a plurality of offices (e.g., an office in Boston, an office in Los Angeles, and an office in Dublin). Do-not-disturb circumvention process 10 may define 106 an exception list including one or more trusted users associated with each office of company x (e.g., one trusted user associated with the Boston office, one trusted user associated with the Los Angeles office, and one trusted user associated with the Dublin office). Of course, the number of trusted users included within the exception list may vary according to design preference and user need.

Figure 3:
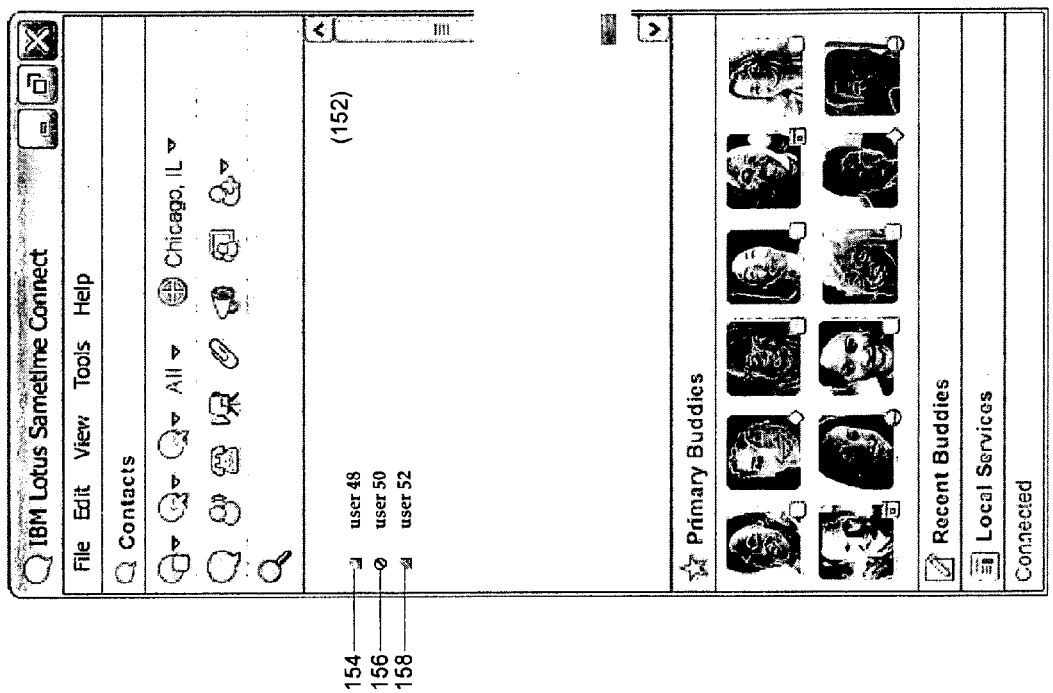
FIG. 3 is a diagrammatic view of an instant messaging user interface rendered by the do-not-disturb circumvention process and/or the instant messaging application of FIG. 1.

Do-not-disturb circumventing process 10 may allow a user to identify 102 a do-not-disturb status of an instant messaging user. For example, and referring also to FIG. 3, an instant messaging application (e.g., instant messaging client 22) and/or do-not-disturb circumvention process 10 may render an instant messaging user interface 150. Instant messaging user interface 150 may include contacts list 152 that may allow user 46 (e.g., who may be a trusted user) to identify instant messaging contacts (e.g., user 48, 50, 52). Status icons (e.g., status icons 154, 156, 158) may be associated with each instant messaging contact (i.e., users 48, 50, 52, respectively), indicating the current status of respective users. Status icons 154, 158 may identify users 48, 52 as being available for instant message chats, and status icon 156 may identify 102 user 50 as being on do-not-disturb status.

Do-not-disturb circumvention process 10 may allow 104 a trusted user to circumvent the do-not-disturb status of the instant messaging user. For example, and as described above, the one or more trusted user (e.g., user 46) may be included within an exception list defined 106 by do-not-disturb circumvention process 10. Based upon, at least in part, user 46's inclusion within the exception list defined 106 by do-not-disturb circumvention process 10, while do-not-disturb circumvention process 10 may allow 102 user 46 to identify an instant messaging user's do-not-disturb status (e.g., the do-not-disturb status of instant messaging user 50), the restrictions and/or controls associated with user 50's do-not-disturb status may not be enforced against user 46 (as a trusted user).

Figure 4:
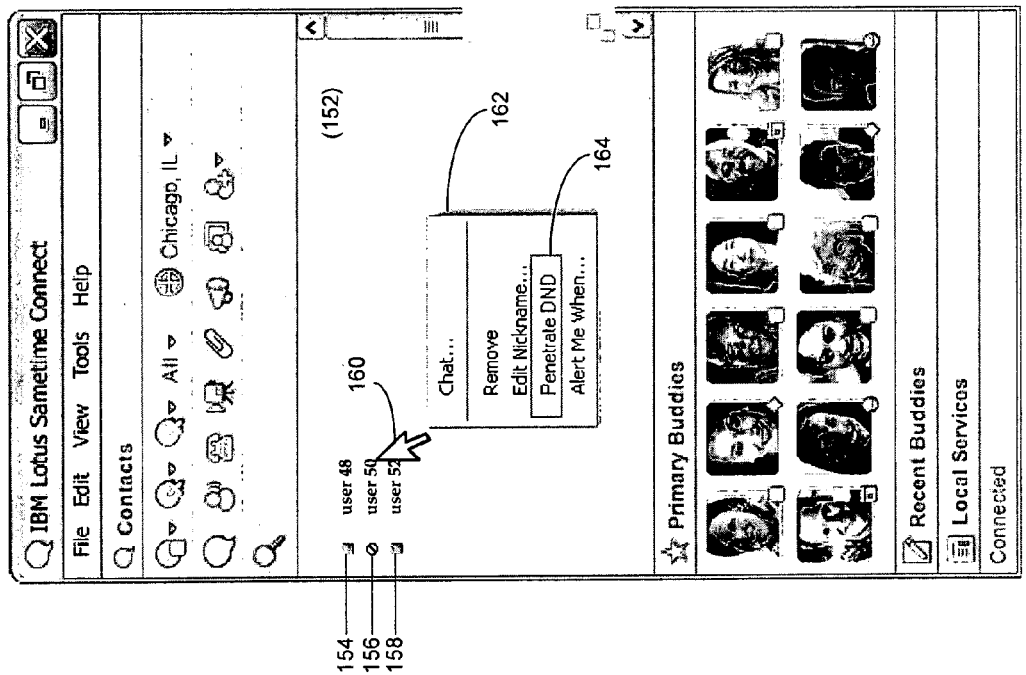
FIG. 4 is a diagrammatic view an instant messaging user interface rendered by the do-not-disturb circumvention process and/or the instant messaging application of FIG. 1.

With additional reference to FIG. 4, do-not-disturb circumvention process 10 may allow 104 user 46 to circumvent the do-not-disturb status of user 50, e.g., based upon user 46 being defined 100 as a trusted user. User 46 may select user 50 in from contact list 152, e.g., using onscreen pointer 160 controlled by a pointing device (e.g., a mouse; not shown), and "right clicking" on user 50. "Right clicking" on user 50 may result in do-not-disturb circumvention process 10 and/or instant messaging client application 22 rendering popup menu 162. Popup menu 162 may define one or more options including, for example, "Chat", "Remove", "Edit Nickname", "Penetrate DND", and "Notify Me When". User 46 may select "Penetrate DND", e.g., using onscreen pointer 160 controlled by the pointing device. By selecting "Penetrate DND", do-not-disturb circumvention process 10 may allow 104 user 46 to circumvent the do-not-disturb status of user 50. By allowing 104 user 46 to circumvent the do-not-disturb status of user 50, user 46 may be allowed to send an instant message directly to 50.

Allowing 104 the trusted user (e.g., user 46) to circumvent the do-not-disturb status of the instant messaging user (e.g., user 50) may include allowing the trusted user to circumvent the do-not-disturb status of the instant messaging user based upon, at least in part, an instant messaging system attribute. The instant messaging system attribute may include, for example, an instant messaging user group. As discussed above, do-not-disturb circumvention process 10 may define 106 an exception list including one or more trusted users associated with each office of company x (e.g., one trusted user associated with the Boston office, one trusted user associated with the Los Angeles office, and one trusted user associated with the Dublin office). Similarly, a group of users may be associated with each office (e.g., as may be reflected in LDAP directory 64). Assume, for example, that user 46 is a trusted user associated with the Boston office of company x. As such, do-not-disturb circumvention process 10 may allow 104 user 46 to circumvent do-not-disturb status of users also associated with the Boston office of company x.

Additionally/alternatively, allowing 104 the trusted user to circumvent the do-not-disturb status of the instant messaging user may include allowing 108 the trusted user to delegate a third party to circumvent the do-not-disturb status of the instant messaging user. For example, and referring also to FIG. 5, selecting, using onscreen pointer 160, "Penetrate DND" from within popup menu 162 may result in do-not-disturb process 10 rendering menu 164. While menu 164 is shown including the options "IM user 50" and "delegate to", this should not be construed as a limitation of the present disclosure, as the number and nature of options included within menu 164 may vary according to design criteria and user need.

Figure 5:
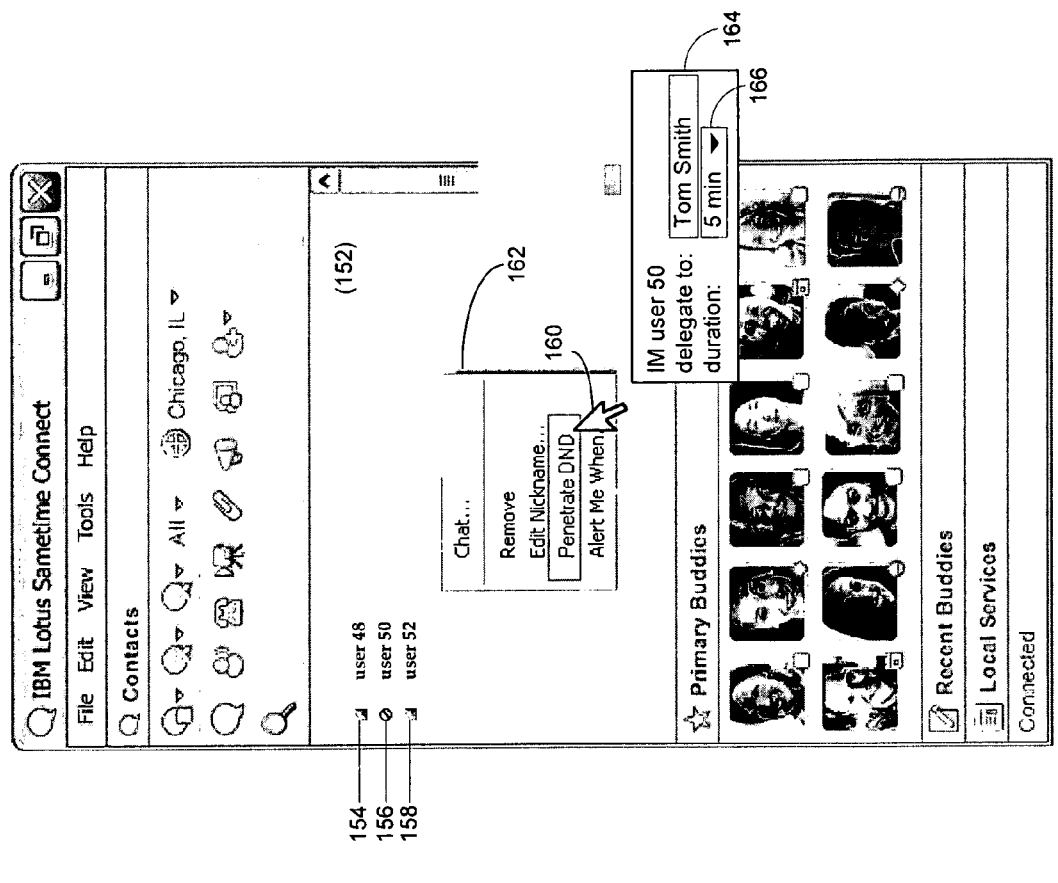
FIG. 5 is a diagrammatic view of an instant messaging user interface rendered by the do-not-disturb circumvention process and/or the instant messaging application of FIG. 1.

Continuing with the example shown in FIG. 5, user 46 may select "IM user 50" from within menu 164 to send an instant message directly to user 50 (e.g., and thereby penetrate user 50's do-not-disturb status). Further, do-not-disturb circumvention process 10 may allow 108 user 46 to delegate a third party to circumvent the instant messaging status of user 50. For example, user 46 may select "delegate to" from within menu 164, and may input the identity of the third party (e.g., which may include a user name, and instant messaging identifier, or the like). Inputting the identity of the third party (e.g., "Tom Smith") may result in do-not-disturb circumvention process delegating the ability to circumvent user 50's do-not-disturb status to Tom Smith.

Allowing 108 the trusted user to delegate a third party to circumvent the do-not disturb status of the instant messaging user may include allowing the third party to circumvent the do-not disturb status of the instant messaging user for a predetermined period of time. For example, as shown in FIG. 5, menu 164 may include pull down menu 166 associated with the option "duration." Via pull down menu 166 user 46 may specify a duration for which Tom Smith may circumvent the do-not-disturb status of user 50.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A computer program product comprising a non-transitory computer readable medium having a plurality of instructions stored thereon, which, when executed by a processor, cause the processor to perform operations on a system in which a first instant messaging user has set a do-not-disturb status, and another user has an ability to penetrate the do-not-disturb status of the first user, the operations comprising:

receiving information defining the another instant message user as a trusted instant messaging user of the first instant messaging user, thereby enabling the trusted instant messaging user to delegate an ability to penetrate the do-not-disturb status of the first instant messaging user to a second instant messaging user; and delegating, from the trusted instant messaging user to the second instant messaging user, the ability to penetrate the do-not-disturb status of the first instant messaging user, thereby enabling the second instant messaging user to penetrate the do-not-disturb status of the first instant messaging user based upon, at least in part, the ability to penetrate the do-not-disturb status of the first instant messaging user delegated by the trusted instant messaging user.

2. The computer program product of claim 1, wherein the operations further comprise defining an exception list including one or more trusted instant messaging users.

3. The computer program product of claim 1, wherein the operations further comprise allowing the trusted instant messaging user to delegate to the second instant messaging user the ability to penetrate the do-not-disturb status of the first instant messaging user based upon, at least in part, an instant messaging system attribute.

4. The computer program product of claim 3, wherein the instant messaging system attribute includes an instant messaging user group.

5. The computer program product of claim 1, wherein the operations further comprise allowing the trusted instant messaging user to delegate to the second instant messaging user the ability to penetrate the do-not-disturb status of the first instant messaging user by the trusted instant messaging user inputting the identity of the second instant messaging user.

6. The computer program product of claim 1, wherein the operations further comprise allowing the second instant messaging user the ability to penetrate the do-not disturb status of the first instant messaging user for a predetermined period of time.

7. On a system in which a first instant messaging user has set a do-not-disturb status, and another user has an ability to penetrate the do-not-disturb status of the first user, a computer implemented method comprising:

defining, at a computer device, the another instant message user as a trusted instant messaging user of the first instant messaging user, thereby enabling the trusted instant messaging user to delegate the ability to penetrate the do-not-disturb status of the first instant messaging user;

receiving an instant message from a second instant message user while the do-not-disturb status is set, the trusted instant messaging user having delegated to the second instant message user the ability to penetrate the do-not-disturb status; and allowing the second instant messaging user to penetrate the do-not-disturb status, thereby presenting the instant message to the first instant massage user.

8. The computer-implemented method of claim 7, further comprising defining an exception list including one or more trusted users.

9. The computer-implemented method of claim 7, further comprising allowing the trusted instant messaging user to delegate to the second instant messaging user the ability to penetrate the do-not-disturb status of the first instant messaging user based upon, at least in part, an instant messaging system attribute.

10. The computer-implemented method of claim 9, wherein the instant messaging system attribute includes an instant messaging user group.

11. The computer-implemented method of claim 7, further comprising allowing the trusted instant messaging user to delegate to the second instant messaging user the ability to penetrate the do-not-disturb status of the first instant messaging user by the trusted instant messaging user inputting the identity of the second instant messaging user.

12. The computer-implemented method of claim 7, further comprising allowing the second instant messaging user the ability to penetrate the do-not disturb status of the first instant messaging user for a predetermined period of time.

13. On a system in which a first instant messaging user has set a do-not-disturb status, and another user has an ability to penetrate the do-not-disturb status of the first user a computer-implemented method comprising:
   receiving, at a computer device, information defining the another instant message user as a trusted instant messaging user of the first instant messaging user, thereby enabling the trusted instant messaging user to delegate an ability to penetrate the do-not-disturb status of the first instant messaging user to a second instant messaging user; and
   delegating, from the trusted instant messaging user to the second instant messaging user, the ability to penetrate the do-not-disturb status of the first instant messaging user, thereby enabling the second instant messaging user to penetrate the do-not-disturb status of the first instant messaging user.

14. The computer implemented method of claim 13, further comprising defining an exception list including one or more trusted users.

15. The computer implemented method of claim 13, further comprising allowing the trusted instant messaging user to delegate to the second instant messaging user the ability to penetrate the do-not-disturb status of the first instant messaging user based upon, at least in part, an instant messaging system attribute.

16. The computer implemented method of claim 15, wherein the instant messaging system attribute includes an instant messaging user group.

17. The computer implemented method of claim 13, further comprising allowing the trusted instant messaging user to delegate to the second instant messaging user the ability to penetrate the do-not-disturb status of the first instant messaging user.

18. The computer implemented method of claim 17, further comprising allowing the second instant messaging user the ability to penetrate the do-not disturb status of the first instant messaging user for a predetermined period of time.

19. The computer implemented method of claim 13, further comprising:
   providing a popup menu available from an instant messaging application that allows the trusted instant messaging user to delegate to the second instant messaging user the ability to penetrate the do-not-disturb status of the first instant messaging user based upon, at least in part, the trusted instant messaging user being defined as the trusted instant messaging user.

20. The computer implemented method of claim 13, further comprising:
   providing a popup menu available from an instant messaging application that allows the trusted instant messaging user to delegate to a third instant messaging user the ability to penetrate the do-not-disturb status of the first instant messaging user.

21. A computer program product comprising a non-transitory computer readable medium having a plurality of instructions stored thereon, which, when executed by a processor, cause the processor to perform operations on a system in which a first instant messaging user has set a do-not-disturb status, and another user has an ability to penetrate the do-not-disturb status of the first user, the operations comprising:
   defining the another instant message user as a trusted instant messaging user of the first instant messaging user, thereby enabling the trusted instant messaging user to delegate the ability to penetrate the do-not-disturb status of the first instant messaging user;
   receiving an instant message from a second instant message user while the do-not-disturb status is set, the trusted instant messaging user having delegated to the second instant message user the ability to penetrate the do-not-disturb status; and
   allowing the second instant messaging user to penetrate the do-not-disturb status, thereby presenting the instant message to the first instant massage user.

22. The computer program product of claim 21, wherein the operations further comprise defining an exception list including one or more trusted users.

23. The computer program product of claim 21, wherein the operations further comprise allowing the trusted instant messaging user to delegate to the second instant messaging user the ability to penetrate the do-not-disturb status of the first instant messaging user based upon, at least in part, an instant messaging system attribute.

24. The computer program product of claim 23, wherein the instant messaging system attribute includes an instant messaging user group.

25. The computer program product of claim 21, wherein the operations further comprise allowing the trusted instant messaging user to delegate to the second instant messaging user the ability to penetrate the do-not-disturb status of the first instant messaging user by the trusted instant messaging user inputting the identity of the second instant messaging user.

26. The computer program product of claim 21, wherein the operations further comprise allowing the second instant messaging user the ability to penetrate the do-not disturb status of the first instant messaging user for a predetermined period of time.

* * * * *